United States Patent [19]

Visser

[11] 3,909,040

[45] Sept. 30, 1975

[54] OUTRIGGER

[75] Inventor: Peter J. Visser, Niles, Mich.

[73] Assignee: Clark Equipment Company, Buchanan, Mich.

[22] Filed: Oct. 15, 1973

[21] Appl. No.: 406,749

[52] U.S. Cl. .............................................. 280/150.5
[51] Int. Cl.² ............................................. B60S 9/02
[58] Field of Search ................. 280/150.5; 212/145; 254/86 R, 86 H

[56] References Cited
UNITED STATES PATENTS

| | | | |
|---|---|---|---|
| 3,007,717 | 11/1961 | Noly | 280/150.5 |
| 3,021,015 | 2/1962 | Bowman | 212/145 |
| 3,279,622 | 10/1966 | Person | 212/145 |
| 3,801,068 | 4/1974 | Kopas | 280/150.5 |

Primary Examiner—Robert R. Song
Attorney, Agent, or Firm—Kenneth C. Witt

[57] ABSTRACT

An outrigger comprising telescopic members, one telescopic member being pivotally connected adjacent one side of a vehicle which is to be stabilized and extending beneath the vehicle. The second telescopic member is movable outwardly and inwardly on the first telescopic member by power means. A guide and support member which is initially latched to the frame of the vehicle causes the initial outward extension of the outrigger to be horizontal. Means responsive to the outward movement of the second telescopic member causes unlatching of the guide and support member and results in the outrigger pivoting downwardly during its outward extension.

12 Claims, 16 Drawing Figures

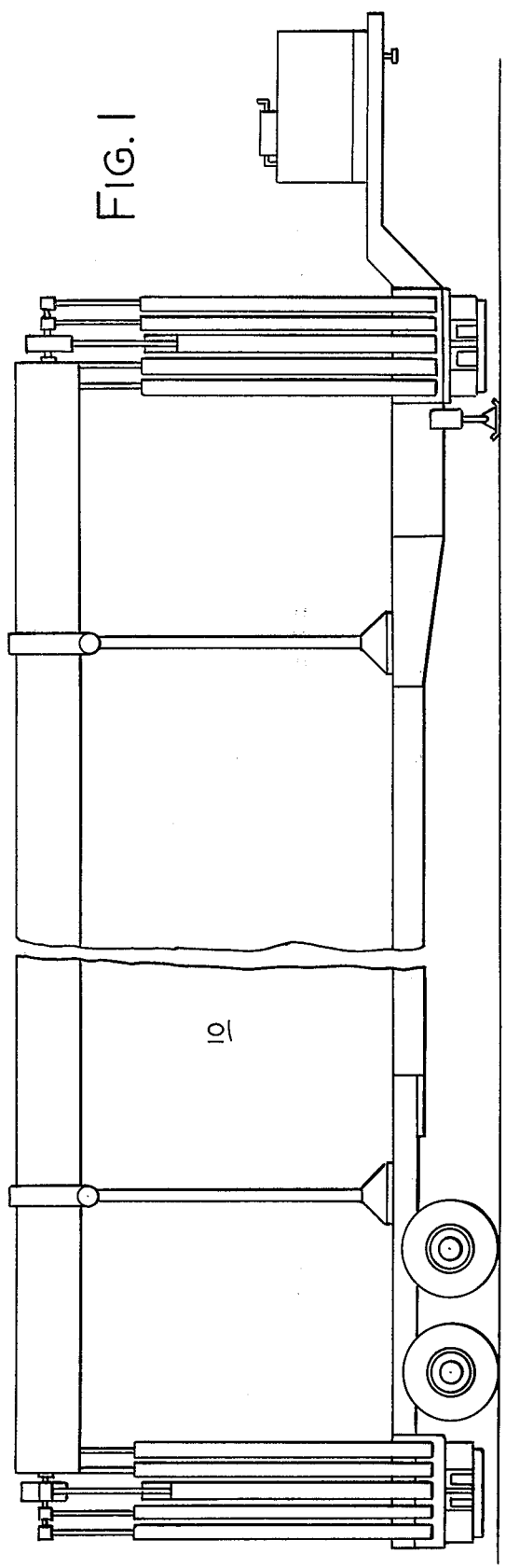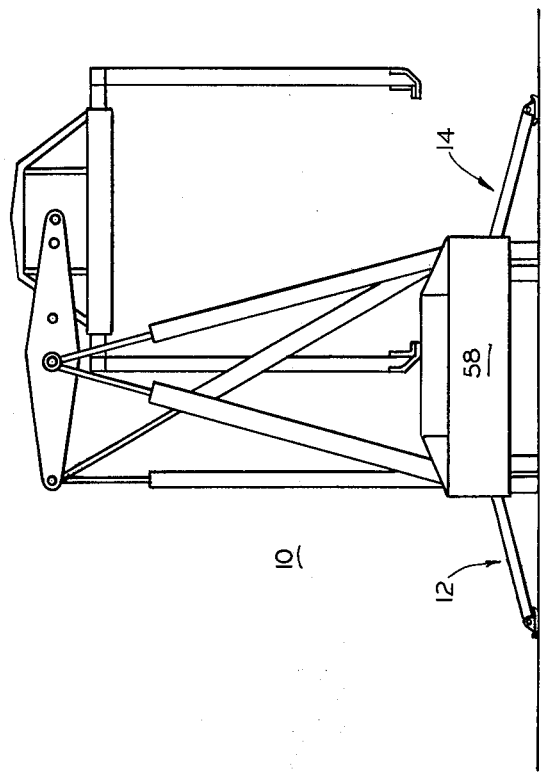

FIG. 8
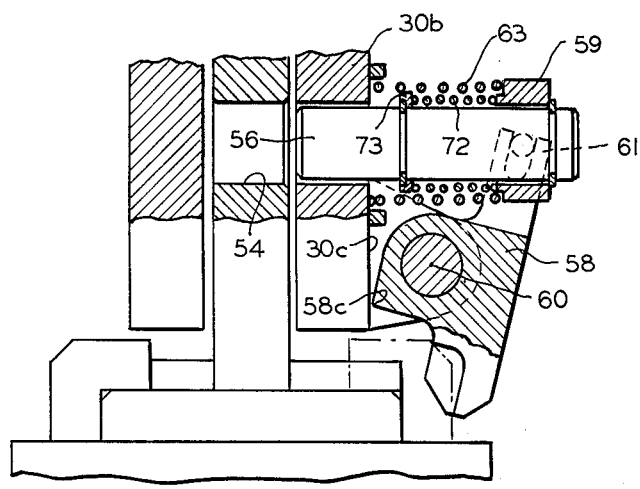
FIG. 9
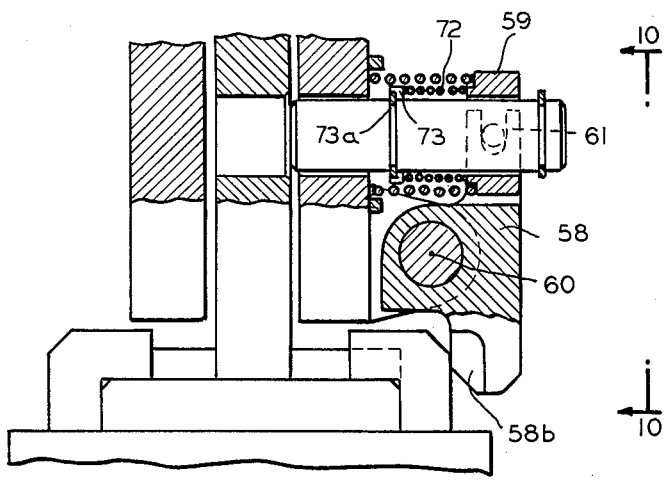
FIG. 10
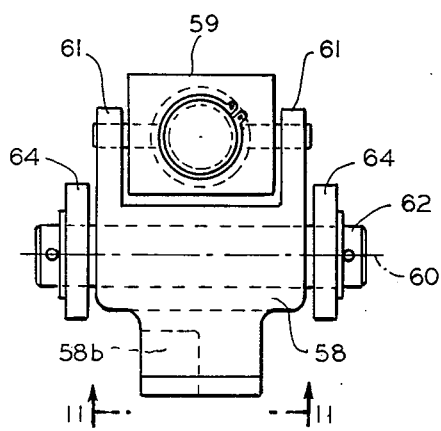
FIG. 11

3,909,040

OUTRIGGER

CROSS-REFERENCE TO RELATED APPLICATION

The outrigger construction of the present invention may be employed advantageously with the load transfer mechanism of U.S. Pat. No. 3,718,221, dated Feb. 27, 1973, which is assigned to the same assignee as the present invention. However, it will be appreciated that it is not limited to such use, but may be applied also to other load transfer and load handling mechanisms and vehicles which require stabilization.

BACKGROUND OF THE INVENTION

1. Field of the Invention

This invention relates to outrigger mechanisms utilized to stabilize vehicle mounted load handling and load transfer mechanisms and the like and to make it possible for such mechanisms to have a greater reach without instability or overturning. The use of outriggers as stabilizers in effect extends the base of the vehicle or other mechanism and thus makes it possible to shift the center of gravity a greater distance laterally without getting it beyond the point which might result in overturning.

2. Description of the Prior Art

Various devices have been used heretofore to stabilize vehicles and other mechanisms, and attention is called to the outrigger of my U.S. Pat. No. 3,743,108, dated July 3, 1973, which is assigned to the same assignee as the present invention. In the outrigger mechanism disclosed and claimed therein an outer telescopic member is pivotally connected adjacent one side of the vehicle to be stabilized and extends beneath the vehicle. The other end of the outer telescopic member is connected to the vehicle by means of a bracket which is movable longitudinally along the outer telescopic member. There is a track on the bracket at an angle with the axis of the outrigger, and a guide and support member is located on the vehicle and co-acts with the track. The bracket is moved in and out to produce vertical movement of the outer end of the outrigger.

A common type of outrigger is a straight, horizontally disposed beam which is extended either manually or by power means and then a jack or float at the end of such beam is lowered, again either manually or by power means, to provide vertical adjustment for the outrigger.

Still another known type of outrigger utilizes a member which is curved and extends along a curved path from beneath the vehicle out to the side to accomplish movement which includes both a horizontal component outwardly and a vertical component downwardly, and an example of such an outrigger is illustrated by U.S. Pat. No. 3,021,015 dated Feb. 13, 1962.

A principal object of the present invention is an outrigger which utilizes a single power actuator to extend and retract the outrigger and also to move it vertically down and up, while providing for the initial extension movement of the outrigger to be rectilinear and generally horizontal.

SUMMARY OF THE INVENTION

In carrying out my invention in one mode, I provide an outrigger having an inner elongated member which is pivotally connected to the frame of a vehicle adjacent one side. It is disposed in a horizontal position and extends toward the other side of the vehicle. An outer telescopic member surrounds the inner member and is movable outwardly and inwardly on the inner member, and power means are provided for selectively moving the outer member outwardly and inwardly. Guide and support means interconnected between the outrigger and the frame of the vehicle are responsive to movement of the outer member for causing the outrigger to pivot downwardly during outward movement of the outer member, whereby the movement of the outrigger is first horizontal and then as it nears the end of its travel the outer end moves downwardly to engage the ground.

BRIEF DESCRIPTION OF THE DRAWING

FIG. 1 shows a schematic side elevational view of a load transfer mechanism with which the outrigger of the present invention may be utilized advantageously, FIG. 2 shows a schematic end view of the load transfer mechanism of FIG. 1 with outriggers in their extended positions, FIG. 8 is a fragmentary view showing a portion of FIG. 7 in a different operating condition, FIG. 9 is a fragmentary view the same as FIG. 8 except showing a different operating condition, FIG. 10 is a partial view along the line 10—10 of FIG. 9, FIG. 11 is a fragmentary view along the line 11—11 of FIG. 10.

DESCRIPTION OF PREFERRED EMBODIMENT

Figure 3:
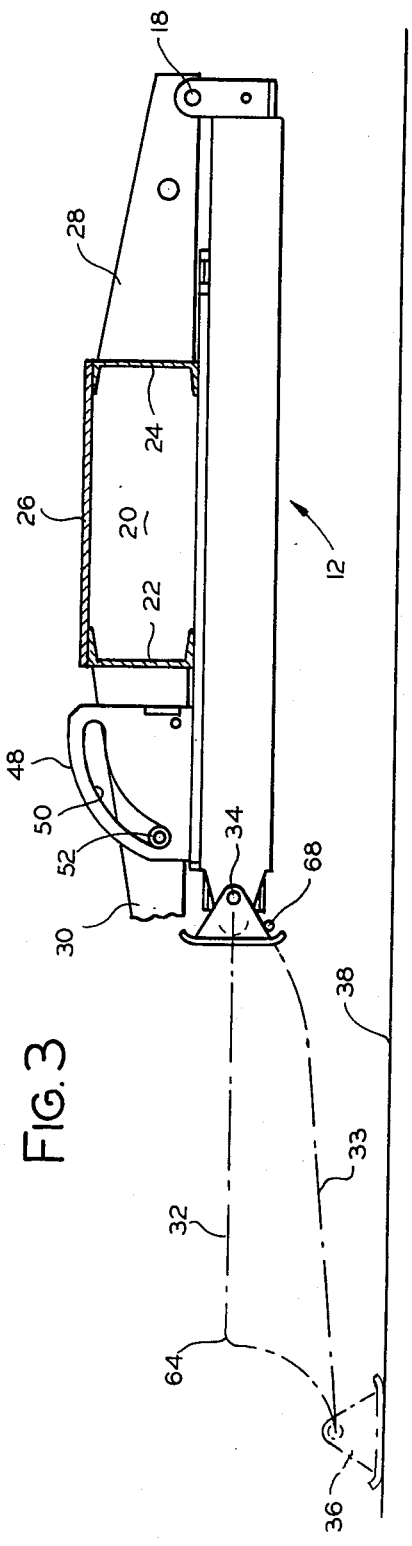
FIG. 3 is a side elevational view of an individual outrigger in its retracted position.

FIGS. 1 and 2 of the drawing show a load transfer mechanism 10 the same as the aforementioned U.S. Pat. No. 3,718,221 except for the incorporation of outriggers in accordance with the present invention. There are four individual outriggers at the rear portion of the load transfer mechanism and four similar outriggers at the front portion. All outriggers are shown retracted in FIG. 1.

FIG. 2 shows a schematic end elevational view of the load transfer mechanism of FIG. 1, looking from the left, with the rear outriggers of the first embodiment housed within the transverse box portion 58, and two of the outriggers identified by the numerals 12 and 14 extended respectively to the left and right.

FIG. 3 shows schematically individual outrigger 12 in its raised contracted position, with most of the structural portion of the load transfer mechanism omitted for the sake of clarity. The other individual outriggers are essentially the same except that half of them, including outrigger 14, are reversed in position and arrangement.

The outrigger 12 is a telescopic device which includes an inner hollow elongated member 16 of approximately square cross section (See FIG. 4) which is pivotally connected at 18 to the frame 20 of the load transfer mechanism. As shown schematically, the frame 20 includes a pair of longitudinal channel members 22 and 24, a top cover plate 26 welded to the channel members, and a pair of outward or lateral projections 28 and 30 on opposite sides of the frame structure for supporting the outriggers.

FIG. 3, in addition to showing the outrigger 12 in retracted position, also shows by a dot-dash line 32 the path which the pivot point 34 on the outrigger follows during the extension of the outrigger and movement of the outrigger downwardly to rest the foot plate 36 on the ground 38. Foot plate 36 is pivoted at 34 on the outer telescopic member 40 of the outrigger, and moves from the retracted position shown in solid lines in FIG. 3 to the extended position illustrated in dot-dash lines in FIG. 3 in a manner in which point 34 is caused to follow line 32 as explained hereinafter.

Figure 4:
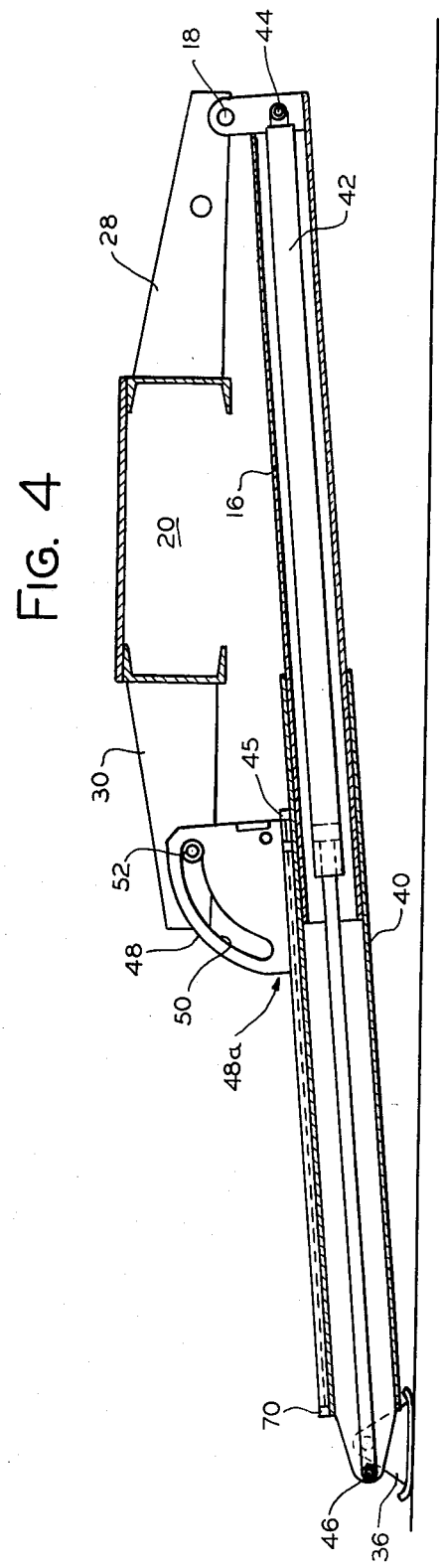
FIG. 4 is a sectional view of the same outrigger in its extended condition.

As shown in FIG. 4, outrigger 12, in addition to inner telescopic member 16 and outer telescopic member 40, includes a piston and cylinder type hydraulic actuator 42 which is pivotally connected between location 44 at one end of the outrigger on the inner member 16 and location 46 at the other end of the outrigger on outer member 40. The actuator 42 is operated hydraulically by remote control in a known manner to extend and retract the actuator and the outrigger but it will be appreciated that other actuators, including pneumatic and electric may be utilized if desired.

As seen best in FIGS. 5 and 6, an upwardly projecting guide support and load transfer member 48, hereinafter generally referred to as a bracket, is provided to support and guide the outrigger and transfer forces to it. The bracket 48 includes a slot 50 which in this instance is arcuate. Slot 50 is arranged to move relative to a pin 52 which is fixed on the frame 20 by being secured to frame portion 30. Bracket 48 also includes an opening 54 which is utilized for latching the bracket in position during the first portion of an outward stroke of the outrigger in a manner which is explained hereinafter.

Figure 5:
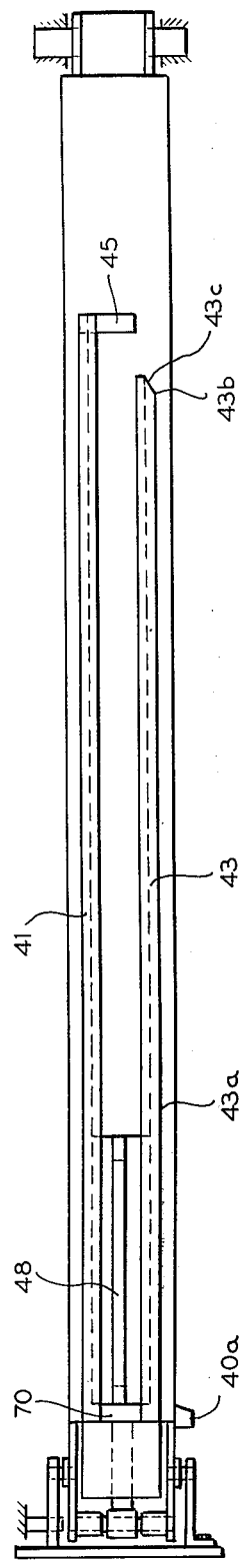
FIG. 5 is a top plan view of the outrigger of FIG. 3.
Figure 7:
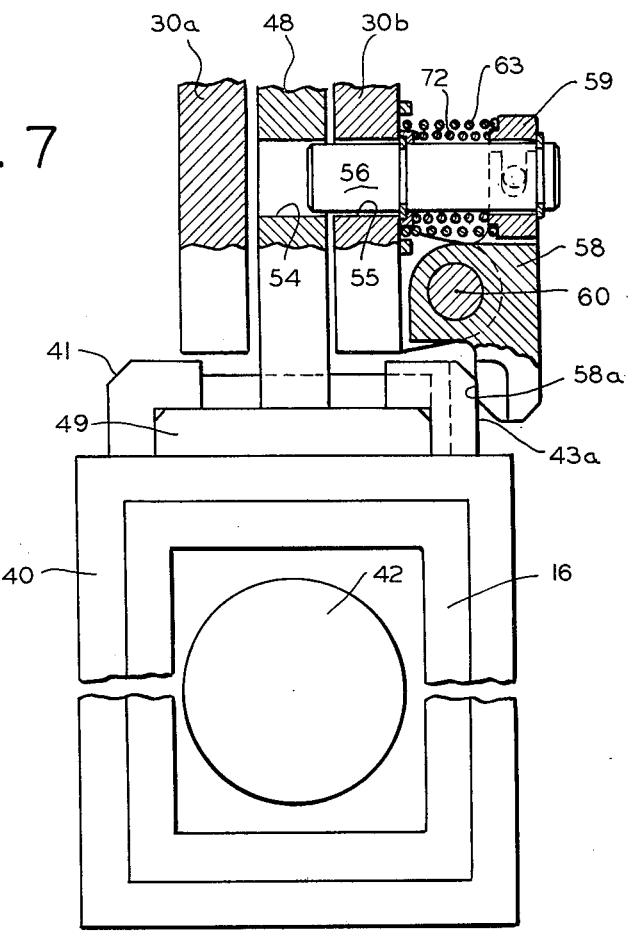
FIG. 7 is a sectional view along the line 7—7 of FIG. 6.

As shown best in FIG. 5 and in FIG. 7, bracket 48 supports and guides the outer telescopic member 40 and through it the entire outrigger 12. The bracket 48 has a base portion 49 welded to the vertically extending portion of the bracket, and the upper surface of member 40 is provided with longitudinally extending guides 41 and 43 which, as shown, are inverted L-shaped pieces welded to the upper surface of member 40. Guides 41 and 43 provide a track which moves along bracket 48 as described hereinafter.

Figure 6:
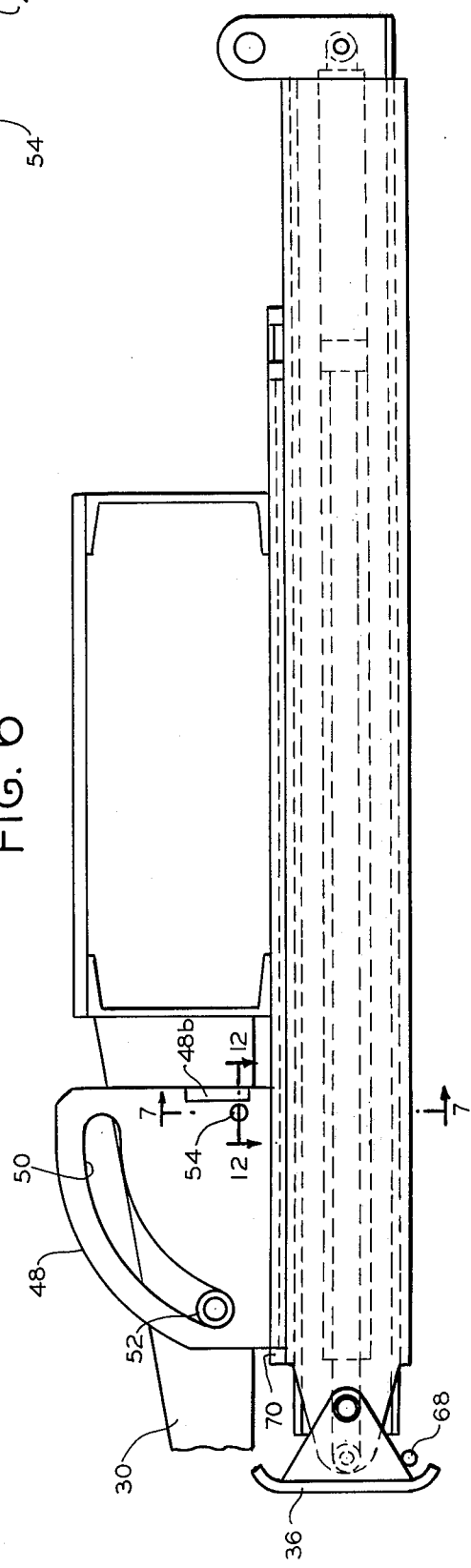
FIG. 6 is a side elevational view of the same outrigger.

FIG. 7 which is a sectional view along the lines 7—7 of FIG. 6 shows several parts which were omitted from FIG. 6 and other figures in order better to illustrate the invention. As shown in FIG. 7, the outrigger may be equipped with a locking pin 56 which, in the retracted position of the outrigger, extends through an opening 55 in frame portion 30b and into an opening 54 in bracket 48 in order to latch bracket 48 so that initially it will not move when outer telescopic member 40 is extended. As illustrated in FIG. 7, the frame portion 30 is bifurcated and has two parts, 30a on one side of bracket 48 and portion 30b on the other side. Pin 56 is mounted on a pivotal member 58 which is pivoted about axis 60. FIG. 10 shows axis 60 and also shows a pivot pin 62 which is supported by a pair of brackets 64 which in turn are secured to the outer surface of portion 30b of the frame.

When the outrigger is fully retracted as illustrated in FIGS. 3, 5 and 6, locking pin 56 is in the position shown in FIG. 7, and inner surface 58a of pivot member 58 bears against the side surface 43a of guide 43. As the outrigger is extended toward the position of FIG. 4, the position of the locking pin 56 is maintained until point 43b of the side surface of guide 43 is reached at which point, as extension of the outrigger continues, compression spring 63 causes member 58 to pivot to the position shown in FIG. 8 and locking pin 56 to be withdrawn from opening 54. Member 58 pivots until edge 58c contacts the side surface 30c of frame portion 30b. It will be observed that compression spring 63 is located between frame portion 30b and abutment member 59 which is pivotally mounted in bifurcated portions 61 at the top of pivot member 58.

When bracket 48 has been thus unlatched from the frame, it is engaged by an abutment member 45 on the top of member 40 and moves outwardly with telescopic member 40. This causes the bracket and the outrigger supported thereby to pivot downwardly, to the position illustrated in FIG. 4 in which the bracket 48 has moved so that the pin 52 is at the upper and inner end of the slot 50. Referring to FIG. 3, the point at which the unlatching takes place is illustrated by location 64 on the dot-dash line 32 which illustrates the path of outward movement of the end of the outrigger. The line 32 is approximately horizontal and along the axis of the outrigger 12 until it reaches location 64 at which time, because of the action of bracket 48, the outer end of the outrigger follows the downwardly curved path illustrated. It will be understood that the configuration of such downward path is determined by the configuration of slot 50.

In the retracted position, foot plate 36 is held in a vertically disposed position as shown in FIG. 3 by a pin 68 which is connected to the frame 20. At the outer or extended position foot plate 36 is in the horizontally disposed position and is held in approximately that position as the outrigger is extended by a projection 40a (See FIG. 5) projecting outwardly from the side of telescopic member 40.

When the outrigger 12 is retracted by contracting the actuator 42, the pivot point 34 follows the path indicated by the dot-dash line 33 in FIG. 3. On such return stroke the bracket 48 does not move until the outrigger is nearing the retracted position and it then is engaged on surface 48a by an abutment member 70 on the upper surface of member 40 and moves relative to pin 52 so that the outrigger returns to the initial raised position shown in FIG. 3.

Figure 12:
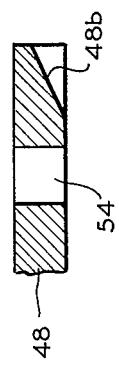
FIG. 12 is a fragmentary view along the line 12—12 of FIG. 6.

In order to reset pivot member 58 so that it will again reengage pin 56 in opening 54, a slanted or cam surface 58b (See FIGS. 10 and 11) is provided on the inner surface of the lower portion of pivot member 58. When outer telescopic member 40 is retracted, surface 43c (See FIG. 5) on guide 43 engages surface 58b and moves member 58 to the condition illustrated in FIG. 9. Also, in order to move the locking pin 56 to the right to allow bracket 48 to move past without interference by pin 56 a slanted surface 48b is provided on bracket 48. This is shown in FIG. 6 and in section in FIG. 12.

When the outrigger is completely retracted to the position shown in FIGS. 3, 5 and 6, the pin 56 then is reinserted into opening 54 automatically by means of compression spring 72 which acts between abutment member 59 and a collar 73, held by a snap ring 73a, which is installed on pin 56 to engage the opposite end of spring 72. At this time the outrigger then is back to its initial condition with bracket 48 latched and ready for another operating cycle of extension and retraction.

While there has been disclosed in detail herein a mechanical arrangement for latching bracket 48 during the first portion of extension of the outrigger, unlatching it automatically during such extension, and then relatching it again when the outrigger is completely retracted, it will be appreciated that other equivalent arrangements can be used. For example, a combination electrical and hydraulic arrangement can be used as illustrated schematically in FIG. 13. In this figure corresponding parts have the same identifying numerals as in the other figures, as far as possible.

Figure 13:
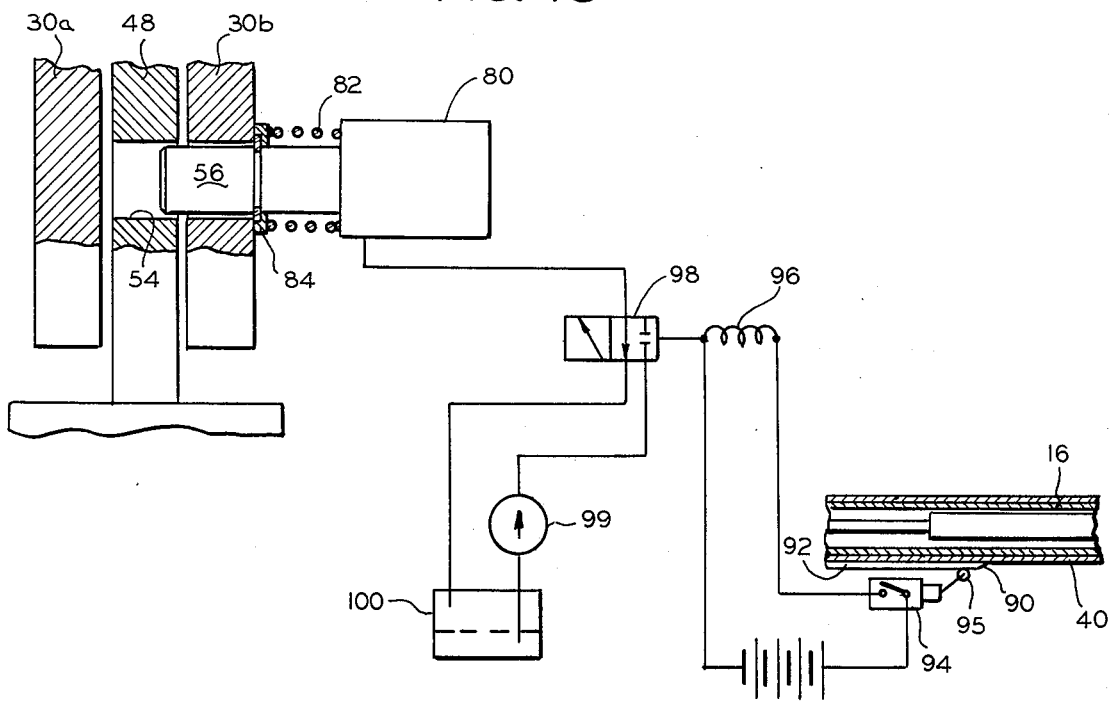
FIG. 13 shows a combined electric and hydraulic system for operating the locking pin for the guide and support member.

In FIG. 13 locking pin 56 is operated by means of a hydraulic actuator 80 which acts in opposition to a compression spring 82. Spring 82 is located between actuator 80 and a collar 84 and urges the pin 56 toward the latched position. To unlatch the pin in the arrangement of FIG. 13, a cam surface 90 on a longitudinal projecting portion 92 on the side of telescopic member 40 operates an electric switch 94 when member 40 is moved past the selected location at which the pin 56 is to be withdrawn. At the selected location telescopic member 40 has moved out sufficiently that the roller 95 on the switch 94 moves down cam surface 90 and closes switch 94; the result is the operation of solenoid valve 96,98 and the discharge of pressurized fluid from pump 99 into hydraulic actuator 80 to operate it. When telescopic member 40 returns in the other direction and opens switch 94 again valve 98 is restored to its off position (shown in FIG. 13) and the fluid drains from hydraulic actuator 80 bakc to the reservoir 100; and spring 82 restores pin 56 to latching engagement in opening 54.

Figure 14:
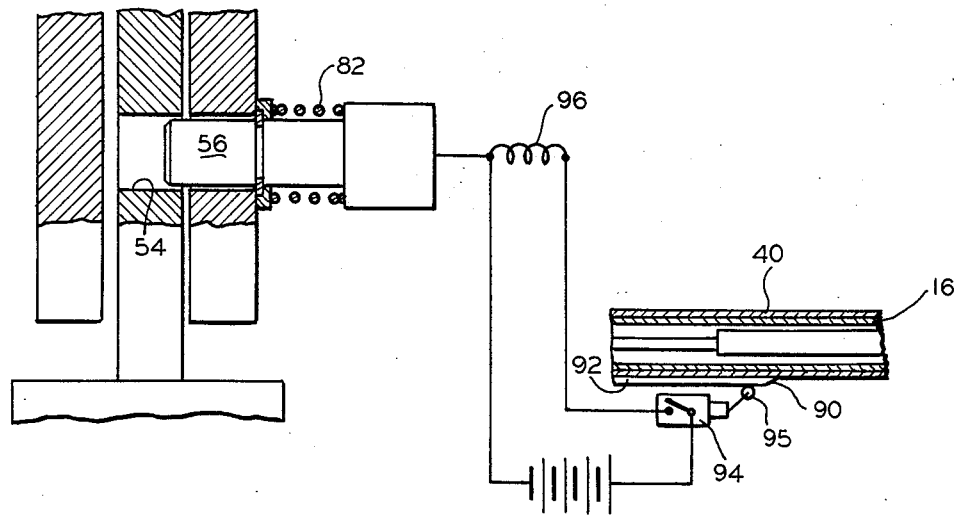
FIG. 14 shows an all electrical system for operating the locking pin for the guide and support member.

FIG. 14 shown an arrangement similar to that of FIG. 13 except that it is entirely electrically operated, the hydraulic portions being omitted. In this case, operation is the same except that solenoid 96 operates directly to withdraw pin 56 upon closure of switch 94; and upon the opening of switch 94 again and the deactivation of the solenoid, the spring 82 causes the pin 56 to be returned to the opening 54 in bracket 48.

Figure 15:
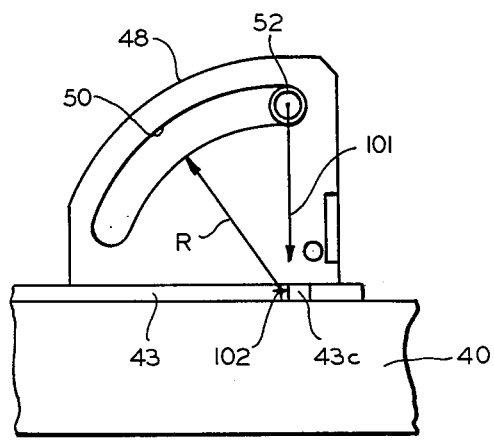
FIG. 15 illustrates the self-locking characteristics of the outrigger in its extended position and, FIG. 15a shows a modified construction of the guide and support member to provide more positive locking if necessary.
Figure 15A:
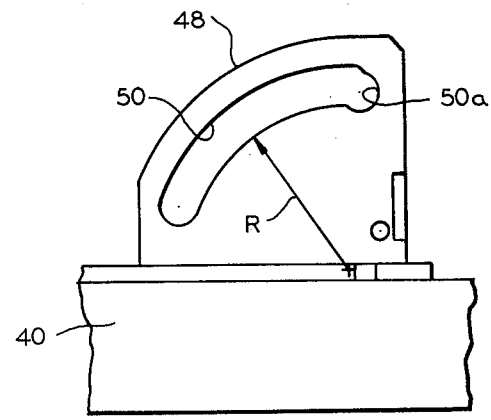

It will be appreciated that the outrigger of the present invention provides a construction in which a single power actuator is utilized both to extend the outrigger parallel to its original axis, which is normally approximately horizontal, and then after the foot plate has cleared any intervening obstructions moves the end of the outrigger down so that the foot plate engages the ground. Moreover, the construction described and illustrated herein provides for self-locking in the extended position as will be apparent from FIG. 15. In FIG. 15 the numeral 101 illustrates the force vector representing the load which is applied from the vehicle frame through pin 52 and bracket 48 and thence to the upper surface of the outer telescopic member 40 of the outrigger; and from there through the outrigger and foot plate 36 to the ground. Inasmuch as such force vector falls to the right of the center 102 of arcuate opening 50 — R indicates the radius of the inner edge — the weight of the load transfer mechanism tends to hold the outrigger in the extended position. However, if desired, in order to counteract any shifting of load or improper alignment which may cause the force vector to shift to the left of point 102 it is possible to have the upper right end of opening 52 extend downwardly somewhat as illustrated in FIG. 15A and identified by the number 50a to provide an even greater "overcenter" action.

While I have illustrated and described herein a preferred mode of carrying out my invention it will be appreciated that modifications may be made. Accordingly, it should be understood that I intend to cover by the appended claims all such modifications which fall within the true spirit and scope of my invention.

I claim:

1. An outrigger for a machine having a frame, the outrigger comprising an inner elongated member, a connection adjacent one end of the said inner member pivotally connecting the inner member to the frame, an outer member housing the said inner member and movable outwardly and inwardly of the inner member, power means for selectively moving the said outer member outwardly and inwardly of the said inner member, and movable guide and support means interconnected between the said outer member and the frame and responsive to movement of the outer member for causing the outrigger to pivot away from the frame during outward movement of the said outer member.

2. An outrigger as specified in claim 1 in which the said movable guide and support means also causes the outrigger to pivot toward the frame during inward movement of the said outer member.

3. An outrigger as specified in claim 1 in which the said movable guide and support means comprises a bracket normally latched to the machine frame and a portion on the bracket for supporting the outrigger and guiding outward movement of the outer member.

4. An outrigger as specified in claim 3 in which means are provided for unlatching the said bracket at a predetermined amount of extension of the said outer member.

5. An outrigger specified in claim 4 in which the said outer member carries an abutment which engages the said bracket at a predetermined position and moves it with the outer member during continued extension of the outer member.

6. An outrigger as specified in claim 4 in which the said bracket is provided with a slot receiving a pin which is secured to the vehicle frame, and the slot is arranged to move the outrigger away from the frame as outward extension continues after the said bracket is unlatched.

7. An outrigger as specified in claim 2 in which the said outer member carries an abutment which engages the said bracket at a predetermined position and moves it with the outer member during inward movement of the outer member.

8. An outrigger as specified in claim 4 in which the said means for latching the bracket includes an opening in the bracket, a pin pivotally mounted on the vehicle frame, and means responsive to outward movement of the said outer member for mechanically disengaging the said pin from the said opening.

9. An outrigger as specified in claim 4 in which the said means for unlatching the bracket includes an opening in the said bracket, a pin disposed to normally engage the said opening, and an electrohydraulic means responsive to movement of the said outer member for disengaging the said pin from the said opening.

10. An outrigger as specified in claim 4 in which the said means for unlatching the bracket includes an opening in the said bracket, a pin disposed to normally engage the said opening, and an electrical means responsive to movement of the said outer member for disengaging the said pin from the said opening.

11. An outrigger for a machine having a frame, the outrigger comprising a pair of elongated telescopic members, a connection adjacent one end of one of the said members pivotally connecting said one member to the frame, the said other member being movable outwardly and inwardly of the said one member, power means for selectively moving said other member outwardly and inwardly, and movable mechanical guide and support means connected between one of the said telescopic members and the frame and responsive to the movement of the said other member for causing the said outrigger to pivot away from the frame during the outward movement of the said other member, the said movable guide and support means comprising a bracket normally latched to the machine frame and a portion on the bracket for supporting the outrigger and guiding outward movement of the said other member.

12. An outrigger as specified in claim 11 in which means are provided for unlatching the said bracket at a predetermined amount of extension of the said other member.

* * * * *